Patented Nov. 29, 1938

2,138,557

UNITED STATES PATENT OFFICE 2,138,557

INSECTICIDE

Charles C. Plummer, Mexico, D. F., Mexico; dedicated to the free use of the Public in the Territory of the United States of America No Drawing. Application September 14, 1936, Serial No. 100,683

1 Claim. (Cl. 167—22)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the public in the territory of the United States of America to take effect upon the granting of a patent to me.

This invention relates to improvements in materials and methods for destroying or checking the growth or multiplication of insect life which is economically injurious to man.

An object of this invention is to provide a material that is effective in the control of fruit flies.

Another object of this invention is to provide an insecticide that also has fungicidal properties.

Another object of this invention is to provide a material that is non-injurious to the foliage of citrus trees and other vegetation upon which it may be sprayed or dusted.

Another object of this invention is to provide a material that is relatively toxic to insects and relatively non-toxic to man and domestic animals and the presence of which in a spray residue on fruits and vegetables does not constitute a menace to those eating such products.

Another object of this invention is to provide a material that is cheap and can be readily prepared.

Still another object of this invention is to provide a material that is green in color and that does not leave an unsightly deposit when sprayed upon green foliage.

Still another object of this invention is to provide a material that is attractive to insects and induces them to eat of it and yet contains a poison that kills them.

I have found that copper sucrate is toxic to fruit flies especially the Mexican fruit fly (*Anastrepha ludens* Wd.) and the Mediterranean fruit fly (*Ceratitis capitata* Wied.). Copper sucrate is a compound of the formula, $C_{12}H_{22}O_{11}.Cu(OH)_2$. It is best made by the interaction of cupric hydroxide with a cold concentrated solution of sucrose. The reaction is as follows:

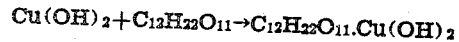

Cupric hydroxide is prepared by adding sodium hydroxide to a cold aqueous solution of copper sulphate according to the equation:

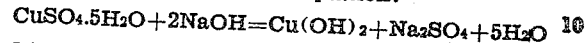

The cupric hydroxide is removed by filtration and washed. In order to prevent the formation of cupric oxide, a small quantity of sugar (sucrose) may be added to the mixture before the cupric hydroxide is washed on the filter.

For use as an insecticide copper sucrate or a sugar solution containing copper sucrate is added to water and applied as a spray to trees, etc., infested by fruit flies. The preferred dosage is 8 pounds copper sucrate to 100 U. S. gallons of water but good results are obtained with 4 pounds per 100 gallons. Flies are attracted to this spray and after eating it die.

An example of the relative toxicity of copper sucrate, tartar emetic and nicotine tartrate to the Mediterranean fruit fly is as follows:

| | Hours to kill 100 per cent |
|---|---|
| Copper sucrate, 4 lbs./100 gals | 64 |
| Tartar emetic, 4 lbs./100 gals | 76 |
| Nicotine tartrate, 2 lbs./100 gals | 64 |

Tartar emetic and nicotine salts are the most effective poisons now known for combating fruit flies but suffer from the disadvantage of being highly poisonous to man. Tartar emetic, except in low concentrations, may injure the fruit and foliage of citrus trees upon which it is sprayed.

Having fully disclosed by discovery, I claim:

An insecticide containing, as its essential active ingredient, copper sucrate.

CHARLES C. PLUMMER.